United States Patent [19]

Ding et al.

[11] Patent Number: 5,699,361
[45] Date of Patent: Dec. 16, 1997

[54] MULTIMEDIA CHANNEL FORMULATION MECHANISM

[75] Inventors: Hung-Pei Ding, Yung-Ho; Shoou-Gwo Jiang, Keelung; Feng-Min Pan, Hsinchu; Jihng-Ming Liou, Taipei, all of Taiwan

[73] Assignee: Industrial Technology Research Institute, Hsinchu, Taiwan

[21] Appl. No.: 503,698

[22] Filed: Jul. 18, 1995

[51] Int. Cl.[6] ............................................. H04J 3/16
[52] U.S. Cl. ................................... 370/431; 370/468
[58] Field of Search ........................... 370/94.1, 60, 60.1, 370/95.1, 85.6, 85.7, 17, 431, 433, 437, 443, 444, 464, 465, 468

[56] References Cited

U.S. PATENT DOCUMENTS 4,964,119 10/1990 Endo et al. ............................. 370/60
5,251,209 10/1993 Jurkevich et al. ..................... 370/94.1

*Primary Examiner*—Hassan Kizou
*Assistant Examiner*—Kwang B. Yao
*Attorney, Agent, or Firm*—Meltzer, Lippe, Goldstein, Wolf & Schlissel, P.C.

[57] ABSTRACT

A communication network and process for communicating thereon is disclosed which can support multimedia communications. Communication channels are formulated using a two step process. In a first step, channel types and fixed attributes thereof are defined. When needed, one or more channels of the predefined types are subsequently allocated in a second step wherein user-definable parameters are specified. The user-definable parameters and fixed attributes of each allocated channel control the scheduling of transmission and receipt of information on each channel.

10 Claims, 6 Drawing Sheets

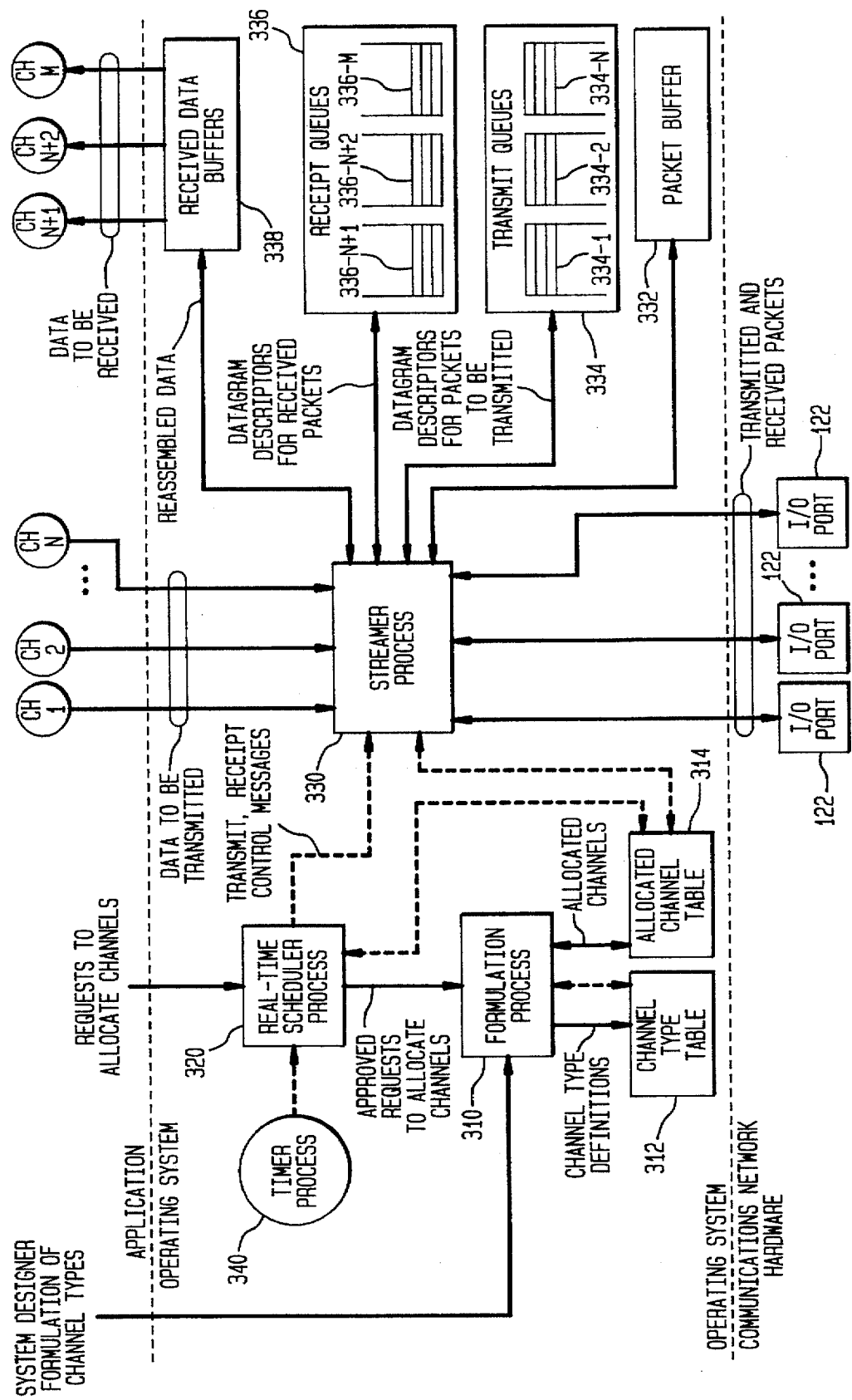

MULTIMEDIA CHANNEL FORMULATION MECHANISM

FIELD OF THE INVENTION

The present invention relates to communications networks. In particular, the present invention relates to a strategy for providing communications channels in a network for supporting multimedia communications, i.e., a combination of text, audio, video, control, etc. communications.

BACKGROUND OF THE INVENTION

FIG. 1 depicts a communication network 10. Illustratively, the communications network 10 is Fiber Distributed Data Interface (FDDI) network although the communications network 10 could also be an Ethernet network, Token Ring network, Asynchronous Transfer Mode (ATM) network, etc.

The communications network 10 includes a communications medium 12 for carrying information between host computers or nodes 14. The communications medium 12 may include optical fibers, coaxial cables, unshielded twisted pairs of wires, switches, multiplexers, etc. Illustratively, communications is achieved by transmitting a bitstream over the communication medium 12 which bitstream is organized into packets or cells. The invention is illustrated herein with a bitstream that is organized into packets. FIG. 2 depicts an illustrative packet 40 which includes a header portion 42 for carrying control information and a payload portion 44 for carrying data. The header portion 42 illustratively includes an address of the destination of the packet. This address may be a datagram address (unique identifier assigned to the host which is to receive the packet) or a virtual address (identifier which is dynamically assigned to each communication). The hosts 14 transmit packets on the communications medium 12. The hosts 14 also monitor the communications medium 12 for packets transmitted thereon from other hosts 14. In response to a specific host 14 detecting a packet destined thereto (i.e., with an address corresponding thereto), the host receives the packet for further processing. Otherwise, the host 14 ignores or discards the packet transmitted on the communications medium 12.

The communications network 10 may be a stand-alone network or may be interconnected to other networks to form a larger network. For instance, FIG. 3 shows the communications network 10 connected to a bridge b1. The bridge b1 serves to isolate the communication network 10 from other networks, such as the communications network 11, yet enable communications between the two networks 10, 11. Collectively, the bridge b1, and communications networks 10 and 11 form a local area network or LAN L1. The LAN L1 may be connected to a router r2 via the bridge b1. The router r2 serves to route communications received thereat to the LANs attached thereto. Illustratively, the router r2 and other routers r3, r4 are interconnected via a backbone network B to form a campus or enterprise network C (so called because such a network is typically deployed at an individual enterprise or campus of office buildings). The campus network C is connected to a wide area network (WAN), such as the Internet, via a router r1. The WAN sprawls from campus network to campus network enabling communications between a host at one campus network and one or more hosts at one or more other campus networks.

As shown in FIG. 1, each host 14 includes a bus 21. Connected to the bus 21 are, a processor or CPU 23, one or more I/O ports 25, a main memory 27, a disk memory 29 and an audio/video I/O device 31. The bus 21 is for transferring data between the devices 23–31 connected thereto. The main memory 27 and disk memory 29 are for storing data. The processor 23 is for executing instructions for purposes of processing data stored in the main memory 27 and disk memory 29 or received or outputted via the audio/video I/O device 31 or the I/O ports 25.

Each I/O port 25 is connected to a network 10 or 11 for purposes of providing communication thereon to and from the host 14. Each I/O port 25 is capable of receiving the packets transmitted on the respective network destined to the host 14 in which the I/O port 25 is contained. Each I/O port 25 is also capable of transmitting packets originating at the host 14 in which the I/O port 25 is contained on the network 10 to other destinations. Such packets may be temporarily stored in the main memory 27 or disk memory 29.

The audio/video I/O device 31 illustratively includes a display device such as a cathode ray tube (CRT) or liquid crystal display (LCD) for displaying still and moving pictures, and loudspeakers for reproducing audio signals. Illustratively, the audio video I/O device 31 also includes a microphone, for receiving voice input, a camera for receiving video input, and a keyboard and mouse for receiving text and other data/control input.

Illustratively, the hosts 14 communicate according to the Transfer Control Protocol (TCP)/Internet Protocol (IP) or User Data Protocol UDP/IP. These protocols control, amongst other things, the packetizing of information to be transmitted, the reassembly of received packets into the originally transmitted information, and the scheduling of transmission and reception of packets. FIG. 4 illustrates a transmission scheme according to these protocols. See D. COMMER, INTERNETWORKING WITH TCP/IP, vol. 1 (1991); D. COMMER & D. STEVENS, INTERNETWORKING WITH TCP/IP, vol. 2 (1991). Illustratively, such schemes are implemented by suitable software executed by the processor 23. According to UDP, an application program executed by the processor 23 divides data for transmission to another destination into segments of variable length. The application program then generates descriptors for each segment, called segment descriptors, and submits such descriptors in requests for transmitting the segments. A UDP process (not shown; contemporaneously executed by the processor 23) enqueues the segment descriptors in the queue 60. In the case of TCP/IP, an application program simply generates a descriptor for each buffer, called a buffer descriptor, which indicates the storage location of data to be transmitted. The application program then submits such buffer descriptors in requests to transmit the data in the buffers. (Herein, "buffer" refers to a portion of the main memory 27 or disk memory 29 in which data is temporarily stored.) A TCP process 56 (contemporaneously executed by the processor 23) enqueues each buffer descriptor in a queue 50. A TCP timer process 52 (contemporaneously executed by the processor 23) periodically generates control descriptors which are also enqueued in the queue 50. The TCP timer process 52 also transmits messages to the TCP process 56 which, in response thereto, dequeues the control message and buffer descriptors from the queue 50, in a first-in first-out order. The TCP process 56 performs different time sensitive management in response to the control messages such as ensuring that packets are successfully received at their destinations within a threshold period of time after transmission. (According to the TCP protocol, a first host which receives a message packet from a second host transmits a special control packet back to the second host acknowledging receipt of the packet. The TCP process 56 executing at the second host waits a certain threshold period of time after transmitting the message packet to the first host for receipt of the acknowledgment control packet. If the second host does not receive the acknowledgment control packet within the threshold period of time, the TCP process 56 executing at the second host assumes that the message packet was not successfully received and retransmits the message packet to the first host.) The TCP process 56 divides the data in the buffers into segments and generates a segment descriptor for each segment. The TCP process then enqueues each segment descriptor in the queue 60. The TCP process 56 may also enqueue other segment descriptors in response to the control descriptors (e.g., segment descriptors of data to be retransmitted) into the queue 60.

An IP process 62 (contemporaneously executed by the processor 23) dequeues each segment descriptor, one at a time, in a first-in first-out order from the queue 60. The IP process 62 generates a packet for each segment descriptor including appropriate header information and writes the data of the segment into the payload portion of the packet. The IP process 62 then enqueues each packet into the one of the transmission queues 70 associated with a selected I/O port 25. Each of the queues 70 is associated with a corresponding I/O port 25 from which the packet is to be transmitted. The I/O port 25 is selected by the IP process 62 depending on the destination of the packet. That is, the IP process 62 maintains a routing table or list of destination hosts and from which I/O port 25 to transmit packets in order to deliver them to the corresponding destination host. Each I/O port 25 dequeues the packets from the corresponding transmission queue 70, in a first-in first-out order and transmits the packet on the communications network 10 attached to that specific I/O port 25.

FIG. 5 illustrates a receiving scheme according to the TCP/IP and UDP protocols. Each I/O port 25 is provided with a receipt queue 70'. Each I/O port 25 receives packets from the communications network to which it is attached, and enqueues the received packets in its corresponding receipt queue 70'. The IP process 62 periodically retrieves each packet from each of the receipt queues 70' in a first-in first-out order (e.g., the receipt queues 70' may be accessed in a round-robin fashion). The IP process 62 then reassembles the segments from the packets by extracting the data in the payload sections of the packets and storing the segments. If the received packet was a UDP packet, the IP process 62 generates a segment descriptor for each segment indicating the memory location in which the segment is stored. The IP process 62 then enqueues the segment descriptor into one of the UDP receive queues 80'. The information is dequeued in a first-in first-out order from the UDP queues to the application program which is to receive the segment. If the received packet was a TCP packet, the IP process 62 enqueues the segment descriptor into a TCP receive queue 50'. The segment descriptors are dequeued from the TCP receive queue in a first-in first-out order by the TCP process 56 which assembles the segments into the originally transmitted data for each communication. This data is stored in a buffer corresponding to a specific communication. The TCP process 56 also signals an appropriate semaphore to indicate that a buffer of data is available for an application program to retrieve. In response to a signaled semaphore, an application program can receive the data in the respective buffer when convenient for that application.

Certain observations can be made regarding the above-noted transmission and receipt schemes. First, a multi-layered queue structure is employed wherein both the transmit and receive communication paths require enqueuing a descriptor, relating to the transmitted or received data, into at least two queues (60, 70) (70', 80') or (70', 50'). Second, the number of queues 70, 70' provided for transmitting or receiving packets which are directly accessible by the I/O ports 25 equals the number of I/O ports 25. Stated another way, there is a one-to-one correspondence between the queues 70 and 70' and the I/O ports 25. Therefore, the transmission of packets for each communication, and the reassembly of received packets, is also controlled by the strict first-in first-out ordering of the queues 70, 70'. The transmission and receipt schemes of FIGS. 4 and 5 are therefore said to be non-preemptive because the transmission and reassembly ordering cannot be changed to give certain communications priority over other communications.

It is desirable to provide multimedia communications on networks such as the network 10. Multimedia communications include communications of combinations of motion video, still video, voice and other audio, text/transactional communication and control messages in interactive and non-interactive fashions. These types of communications have different characteristics. Text/transactional communication is bursty; such communication exhibits a high average to peak bandwidth ratio. Video and audio communications are stream-oriented; they require a rather continuous bandwidth and have an average bandwidth which is typically much higher than that of the text/transactional communications. That is, video and audio must be outputted to the recipient in a continuous fashion without detectable gaps. Such gaps substantially degrade video and audio communications. At best, the gaps are merely annoying to the user; at worst, the gaps can render the reproduced audio or video unintelligible to the user. Furthermore, interactive communications, especially interactive audio communications, require that there be little latency between each direction of the communication. Otherwise, the participants on each end must pause for long periods of time to receive a response to information transmitted to the participant on the other end. Such pauses are unnatural for interactive communication and substantially degrade the communication.

The TCP/IP and UDP/IP protocols are designed for bursty non-interactive, text/transactional oriented communications. In such communications, there is neither a continuity requirement nor a maximum latency ceiling. Rather, all information is transmitted or received in a roughly comparable first-in first-out fashion. It is possible to use TCP/IP and UDP/IP to deliver multimedia information in a communications network such as the FDDI communications network 10. However, because there is no differentiation in treatment amongst the different kinds of communications (no preemption), these protocols can only enable a limited amount of multimedia traffic.

It is therefore an object of the present invention to overcome the disadvantages of the prior art.

SUMMARY OF THE INVENTION

This and other objects are achieved according to the present invention. The present invention illustratively employs a host computer of a network similar to the conventional communications network. Communication is achieved by transmitting a bitstream on one or more communications media in the form of packets or cells. Each host computer includes one or more I/O ports which connect the host computer to the communications medium of one or more communications networks. The I/O ports are connected to a processor and a memory via a bus. Each I/O port receives packets or cells destined to the host and transmits packets or cells from the host computer on the respective connected communications media.

According to the present invention, three processes are contemporaneously executed by the processor of the host to provide communications at the host. A formulation process is provided for defining different types of communications channels and for allocating channels of the predefined types. A real-time scheduler process receives requests from an application process, contemporaneously executing on the host, for allocating channels. In response, the real-time scheduler process determines if adequate resources are available to support the additional requested communication channels. If so, the real-time scheduler process causes the formulation process to allocate the channel. Furthermore, the real-time scheduler schedules each allocated channel for communication in response to a timer by transmitting control messages indicating on which channels transmission and receipt should occur. A streamer process is also provided which responds to the control messages outputted from the real-time scheduler. The streaming process packetizes application data for transmission and selects packets from allocated channels (which channels are specified by the control messages) for transmission from an appropriate I/O port. The streamer process also reassembles received packets of allocated channels (which channels are specified by the control messages) into the originally transmitted data for receipt by an application.

According to one embodiment, a two step formulation process is provided. Initially, one or more channel types are defined and fixed attributes are assigned to each channel type. Illustratively, this is done by the system designer and is not changed in normal use. Thereafter, applications submit request to allocate channels of only the defined types as needed. In allocating a channel, the application specifies user-definable parameters for the channel. The formulation process allocates the requested channels. Illustratively, the formulation process also generates a receive queue for each channel allocated for receipt and a transmit queue for each channel allocated for transmission. These queues are maintained by the streamer process for ordering the transmission and receipt of data on a channel by channel basis.

Illustratively, channels are only allocated by the formulation process after a determination is made by the real time scheduler that the host has adequate resources (i.e., buffers, bandwidth on the communications network, etc.) to support the additional channel, in addition to any channels already allocated. Once allocated, the real-time scheduler process, consults the user-defined parameters and fixed attributes of each channel in determining when to schedule the transmission and receipt of data on each channel. For instance, the user definable parameters can specify the number of buffers to allocate to the communication, a bandwidth requirement, a quality of service, a direction (transmit or receive), etc. Such information controls how often and in what priority the real time scheduler signals the streamer process to transmit packets for each channel. Applications submit data for transmission on specified channels to the streamer process which segments and packetizes the data for transmission. The streamer process generates a descriptor for each packet and enqueues the descriptor into the transmit queue assigned to that specific channel. Likewise, the streamer process receives packets from the I/O ports and enqueues a descriptor for each received packet into the receive queue assigned to that specific channel. In response to the control messages enabling transmission of data on specified channels, the streamer process dequeues descriptors from the transmit queues of the specified channels and transfers the packets corresponding to the dequeued descriptors for transmission from specific I/O ports. In response to control messages enabling receipt of data on specified channels, the streamer process dequeues descriptors from the receive queues of the specified receive channels and reassembles the data of the packets corresponding to the dequeued descriptors.

The channel type definition step of the formulation process enables a system designer to predefine different channel types, each of which is suited for carrying packets of a respective type of communication, i.e., interactive communications, streamed data, control data, reliable data, etc. On the other hand, the dynamic allocation step enables the user or application to create a multimedia session with different combinations of communication types with different quantities and qualities thereof. Thus, the user is provided the best of both worlds; a variety of predefined channel types are provided for different kinds of communications, which the user may structure and vary in order to create a multimedia session of the users choice.

BRIEF DESCRIPTION OF THE DRAWING

FIG. 7 illustrates the inter-relationship of processes for communication according to an embodiment of the present invention.

DETAILED DESCRIPTION OF THE INVENTION

Figure 6:
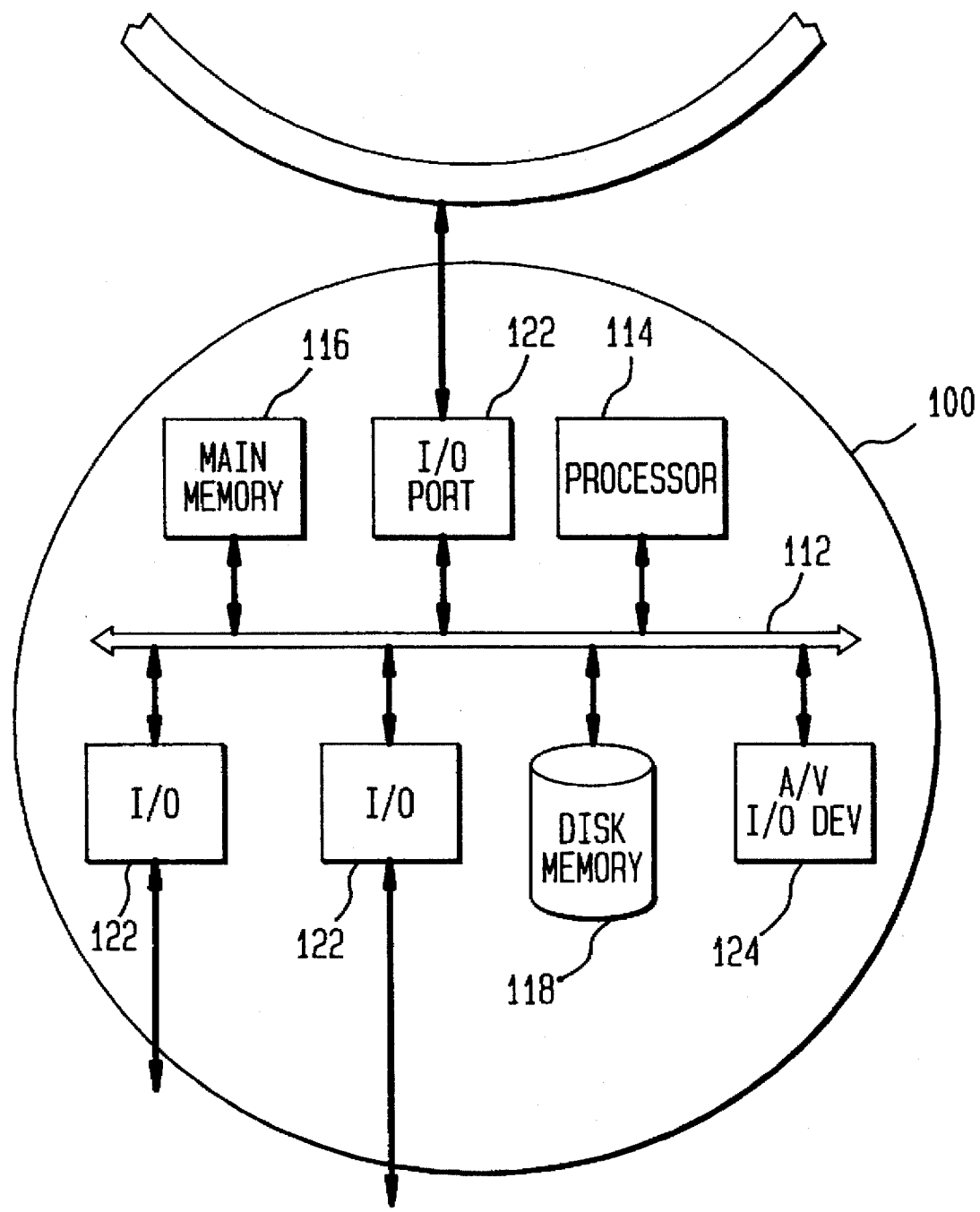
FIG. 6 illustrates a host according to an embodiment of the present invention.

FIG. 6 illustrates a host 100 according to the present invention. The host 100 has an internal bus 112. A processor 114 is provided for executing application programs and processes as described below for achieving communications. A main memory 116 and a disk memory 118 are provided for storing instructions for execution by the processor 114 and data, such as packets of information for transmission from, and receipt at, the host 100. One or more I/O ports 122 are also provided which are attached to one or more communications networks via a respective communications medium. The I/O ports 122 are for transmitting packets from the host 100 in the form of a bitstream. The I/O ports 122 are also for receiving packets, in the form of a bitstream, destined to the host 100 which bitstreams propagate on the respective attached communications media. An audio/video I/O device 124 is provided which illustratively comprises a display device, such as a CRT or LCD, an audio reproduction device, such as loudspeakers, and audio source, such as a microphone, a video source, such as a camera, and a manual text input device, such as a keyboard and mouse. The bus 112 enables the transfer of process instructions and data (including packets) between each of the devices 114–124.

According to the invention, communication is achieved using three processes, called the formulation process 310, the real-time scheduler process 320 and the streamer process 330, which are contemporaneously executed by the processor 114. The inter-relationship of these processes is illustrated in FIG. 7.

Prior to discussing the processes, the data types utilized by the processes are first discussed. The communication process illustratively uses the following data types: datagram descriptors, data unit descriptors, channel type table 312, allocated channels table 314, receipt queues 336 and transmission queues 334. Each data structure is illustratively stored in the memories 116 and 118. Each of these data types is briefly described below.

Datagram Descriptors:

A datagram descriptor is generated by the streamer process 330 for each packet to be transmitted. Datagram descriptors for packets to be transmitted are destroyed by the streamer process 330 when the corresponding packet is transferred to an I/O port 122 for transmission. Datagram descriptors are also generated by the streamer process 330 for each packet received from an I/O port 122. Such datagram descriptors for received packets are destroyed by the streamer process 330 when the packet is reassembled into segments. A datagram descriptor has the following fields:

| | |
|---|---|
| datagram_ID | a unique value identifying the specific datagram descriptor |
| pointer | a pointer to the memory location in the packet buffer 332 at which the corresponding packet is stored |
| size | the size of the packet |
| offset | the position of the corresponding packets payload data relative to the beginning of the segment from which the packet payload data was formed |

Data Unit Descriptors:

A data unit descriptor is generated by the streamer process 330 for each data segment reassembled from one or more packets received from an I/O port 122. Each data unit descriptor is destroyed by the streamer process 330 as a result of normal garbage collection (i.e., after an internal timer indicates that the segment corresponding thereto has gone stale). A data unit descriptor has the following fields:

| | |
|---|---|
| pointer | a pointer to the memory location in the receive buffer 338 at which the corresponding segment is stored |
| data_unit_size | the size of the segment |

Channel Type Table 312:

The channel type table 312 is initially generated by the formulation process 310. The channel type table 312 has one table entry corresponding to each channel type with the following fields:

| | |
|---|---|
| type | an identifier of the channel type |
| attribute 1, attribute2,..., attribute/ | different fixed attributes which are preset initially and are not user-definable, such as access mode. |

The formulation process 310 generates each channel type table entry initially. The channel type table 312 typically is not changed thereafter. Each entry corresponds to a defined channel type which may be later allocated. Only those channel types predefined in the channel type table 312 may be allocated. Each channel type is assigned I (where I is an integer>0) fixed attributes which cannot be altered by the applications which request allocation of channels.

Allocated Channels Table 314:

The allocated channels table 314 stores an entry for each allocated channel. Entries are generated by the formulation process 310 in response to the real-time scheduler process 320 determining that there are sufficient resources to support a requested channel. The entries are likewise destroyed by the formulation mechanism 310 when the channels are deallocated by the applications. Each entry of the allocated channel table 314 has the following fields:

| | |
|---|---|
| channel_ID | a unique number assigned to each allocated channel |
| channel_type | the channel type of the allocated channel |
| parameter1, parameter2,... parameterJ | user-definable parameters which may be specified by the application when requesting the channel, for example, buffer size, bandwidth requirement, quality of service, header information, channel direction (transmit or receive), etc. |
| attribute1, attribute2,..., attribute/ | different fixed attributes associate with the channel_type in the channel type table. |

When an application submits a request to the real-time scheduler process 320 to allocate a channel, the application specifies a value for the J parameters (where J is an integer >0). (Alternatively, for those parameters not specified, default parameters are assigned.) The allocated channel table entries are accessed by the real-time scheduler process 320 in determining when to signal the streamer process 330 to transmit packets of each channel.

Receipt Queues 336:

One receipt queue 336-(N+1), 336-(N+2), ..., 336-(M) is generated and assigned to each of the M–N allocated receive channels by the formulation process 310 upon allocation (where M and N are integers such that M≧N≧0). Likewise, the formulation process 310 destroys each receipt queue 336-(N+1), 336-(N+2), ..., 336-M upon deallocating the corresponding channel. The size of each allocated receipt queue 336-(N+1), ..., 336-M is illustratively set by the formulation process 310 according to a "buffers" parameter in the allocated channels table 314 entry for the respective channel. Each queue entry includes a datagram descriptor and a link to the previous queue entry. The receipt queues 336 are accessed by the streamer process 330 which enqueues data unit descriptors for each packet received by the I/O ports 122 into the receive queue 336-(N+1), 336-(N+2), ..., 336-M associated with the channel of the received packet. The streamer process 330 furthermore dequeues data unit descriptors from the receive queues 336-(N+1), 336-(N+2), ..., 336-M, of specified channels, in a first-in first-out order in reassembling the transmitted data from the received packets.

Transmission Queues 334:

One transmission queue 334-1,334-2, ..., 334-N is generated and assigned to each allocated transmit channel by the formulation process 310 upon allocation. Likewise, the formulation process 310 destroys each transmission queue 334-1,334-2, ..., 334-N upon deallocating the corresponding channel. The size of each allocated transmission queue 334-1, ..., 334-N is illustratively set by the formulation process 310 according to a "buffers" parameter in the allocated channels table 314 entry for the respective channel. The streamer process 330 forms packets from data received from applications and enqueues datagram descriptors of the packets into the transmit queues 334-1,334-2, ..., 334-N of the channels corresponding to the packets. The streamer process 330 dequeues descriptors from the transmission queues 334-1,334-2, ..., 334-N, of specified channels, in a first-in first-out order in response to control messages from the real-time scheduler process 320.

The formulation process 310, real-time scheduler process 320 and streamer process 330 are briefly discussed below.

Formulation process 310:

The formulation process 310 is used to define communication channels. The process is a two-step process. Initially, channel types are predefined, such as interactive media, control, continuous media, reliable data, etc. Once defined, these channel types are generally not changed in normal operation. Thereafter, an application executed by the processor 114 of the host 100, submits requests (as described below) for allocating communications channels of the predefined types. The formulation process 310 allocates the channels of the predefined types. As illustrated in FIG. 7, N channels 1, 2, . . . , N are allocated for transmission and M-N channels N+1, N+2, . . . , M are allocated for receipt where N and M are integers.

The following pseudo code outlines the operation of the formulation process 310. Illustratively two subprocesses are provided:

---
Defining Channels in Channel Type Table
---

```
define channel_type_table data structure to include a variable
    number of channel_type_table_entries;
input channel_type_count;
allocate channel_type_table[1..channel_type_count] of type
    channel_type_table data structure;
for n = 1 to channel_type_count
{
    obtain inputted specification for nth channel type from user
        including input_channel_type and
        input_channel_attribute1,..., input_channel_attributeI;
    channel_table[n].type := input_channel_type;
    channel_table[n].attribute1 := input_channel_attribute1;
    ...
    channel_table[n].attributeI := input_channel_attribute1;
}
```

---
Allocation and Deallocation of Channels
---

```
allocate channel_table[1..max_channels] to include max_channels
    number of channel_table_entries;
alocate channel_tabel[1] for connection-less trasmit
    communication set up control channel C0
{
    channel_table[1].channel_ID := C0;
    channel_table[1].channel_type := CTRL;
    channel_table[1].parameter1 :=
        comm_set_up_ctrl_par1;
    ...
    channel_table[1].parameterJ-:=
        comm_set-up-ctrl_parJ;
    allocate a transmit queue for C0;
}
allocate channel_table[2] for connection-less receive
    communication set up control channel C1
{
    channel_table[1].channel_ID := C1;
    channel_table[1].channel_type := CTRL;
    channel_table[1].parameter1 :=
        comm_set_up_ctrl_par1;
    ...
    channel_table[1].parameterJ :=
        comm_set-up-ctrl_parJ;
    allocate a receive queue for C1;
}
next_ch := next available channel_table entry;
loop while formulation process still executing
{
    if a request to allocate a channel is received from the real-
        time scheduler process with input_channel_ID,
        input_channel_type, input_par1,..., input_parJ
```

-continued

```
    {
        assign default parameter values to non-specified
            input_parj;
        allocate channel_table[next_ch]
        {
            channel_table[next_ch].channel_ID :=
                input_channel_ID;
            channel_table[next_ch].channel_type :=
                input_channel_type;
            channel_table[next_ch].parameter1 :=
                input_par1;
            ...
            channel_table[next_ch].parameterJ :=
                input_parj;
        }
        if the channel to be allocated is a transmit channel
            then
                allocate a transmit queue for the channel having
                    a size equal to the buffers parameter of
                    channel_table[next_ch];
            else
                allocate a receive queue for the channel having
                    a size equal to the buffers parameter of
                    channel_table[next_ch];
        next_ch := next available channel_table entry;
    }
    if a request to deallocate channel having channel_ID = =
        input_channel_ID is received from the real-time
        scheduler process
    {
        search channel_table for channel_table[ptr] for which
            channel_table[ptr].channel_ID = =
            input_channel_ID;
        delete channel_table[ptr];
        if the channel to be deallocated is a transmit channel
            then
                deallocate the transmit queue for the channel
            else
                deallocate the receive queue for the channel;
        next_ch := next available channel_table entry;
    }
}
```

Real-Time Scheduler process 320:

The real-time scheduler process 320 receives the requests to allocate channels generated by the applications and determines if there are sufficient resources to satisfy the requested channels. If so, the real-time scheduler process 320 causes the formulation process 310 to allocate those channels for which there are sufficient resources. The real-time scheduler process 320 also regulates the transmission of packets on each channel in response to a timer process 340 and according to user-definable channel parameters and fixed channel attributes as described in greater detail below.

Below is pseudo code of five illustrative subprocesses executed by the processor 114 in executing the real-time scheduler process:

---
Channel Allocation
---

```
if a request R1 is received from an application to allocate one or
    more channels where R1 includes one or more specified
    parameters input_par1,...,input_parJ for each requested
    channel then
    if there are insufficient resources such as space in the
        channel_table, bandwidth, buffers, etc., to accept R1
            then issue a rejection message to the application
    else
    {
        call streamer process with message M1 for
            transmission on channel C0 to remote host
            specified in R1, which message M1 indicates
            complimentary channels for R1 to be allocated
            at the specified remote host;
```

```
wait for returned message M2 on channel C1;
if returned message M2 from C1 is M2 = = ACCEPT;
{
    for each requested channel
    {
        generate unique channel_ID;
        call formulation process to allocate a
            channel_table entry with
            input_par1,...,input_parJ and
            channel_ID;
        allocate resources such as bandwidth,
            buffers, etc.;
    }
    return channel_IDs to application;
}
else
{
    if returned message M2 from C1 is
        M2 = = REJECT then issue a rejection
        message to the application;
```

Complimentary Channel Allocation

```
if a message M1 is received on C1 requesting allocation of
    complimentary channels for a request R2 issued from a
    remote host then
    if there are insufficient resources such as space in the
        channel_table, bandwidth, buffers, etc., to accept R2
        then call streamer process with message M2 = =
        REJECT for transmission on channel C0 to the
        remote host that transmitted message M1;
    else
    {
        for each requested channel
        {
            generate unique channel_ID;
            call formulation process to allocate a
                channel_table entry with
                input_par1,...,input_parJ and
                channel_ID;
            allocate resources such as bandwidth, buffers,
                etc.;
        }
        return channel_IDs to application specified in message
            M1;
        call streamer process with message M2 = = ACCEPT
            for transmission on channel C0 to the remote
            host that transmitted the message M1;
    }
```

Channel Deallocation

```
if a request R3 is received from an application to deallocate a
    channel with the channel_ID = = input_channel_ID then
    if input_channel_ID does not exist in channel_table then
        issue rejection to application which issued R3
    else
    {
        call formulation process with request to deallocate
            input_channel_ID from channel_table;
        call streamer process with message M3 for
            transmission on channel C0 to remote host
            and application with which the application
            that issued R3 is communicating, wherein M3
            indicates the complimentary channel at the
            remote host which should be deleted;
        deallocate resources such as bandwidth, buffers, etc.;
        issue completion message to application which issued
            R3;
    }
```

Complimentary Channel Deallocation

```
if a message M3 is received via channel C1 from a remote host
    requesting the deallocation of a complimentary channel for
    a channel having channel_ID = = input_channel_ID then
    {
        call formulation process with request to deallocate
            input_channel_ID from channel_table;
        deallocate resources such as bandwidth, buffers, etc.;
        issue channel close message to locally executing
            application that is communicating with the
            application executing on the remote host
            specified in M3;
    }
```

Regulation of Transmission and Receipt on Channels

```
receive timer activation message from timer process;
Loop while bandwidth quota is not met for this time slice;
{
    access channel_table to determine next channel to be
        serviced based on bandwidth requirement of channel
        and available bandwidth for this time slice;
    determine the amount of data to be transmitted or received
        for this channel based on the bandwidth requirement
        of the channel and the bandwidth quota available for
        this time slice;
    if next channel to be serviced is a transmit channel then
        call streamer process with channel_ID of next
        channel and value specifying the number of packets
        to be transmitted;
    if next channel to be serviced is a receive channel then
        call streamer process with channel_ID of next
        channel and value specifying the number of received
        packets to be reassembled into segments for receipt
        by the corresponding application;
}
```

Streamer process 330:

The streamer process 330 receives data to be transmitted from the host 100 on the communications network. The streamer process 330 packetizes the data to be transmitted. The streamer process also receives packets from the communication network via the I/O ports 122. The streamer process 330 reassembles the data from the received packets and transfers the reassembled data to the respective applications. Both the packetizing of outgoing data to be transmitted, and the reassembly of incoming data from received packets, are described in greater detail below. The streamer process 330 receives control messages from the real-time scheduler process 320 which regulate the transmission of packets of each channel. In response to the control messages, the streamer process 330 transfers packets of specified channels to an appropriate I/O port for transmission on the communications medium attached thereto. The streamer process 330 also receives control messages which regulate the reassembly of data from incoming packets received from the I/O ports 122.

The following is pseudo code for five subprocesses executed by the processor 114 in executing the streamer process 330:

Transmit Packets of a Channel

```
if a request to transmit a specific number of packets for a specified
    channel is received from the streamer process then
{
    dequeue one datagram descriptor from the head of the
        transmit queue associated with the specified channel
        for each packet to be transmitted;
    retrieve the packets pointed to by the dequeued datagram
        descriptors from the packet buffer;
    access channel_table to determine the appropriate I/O port
        from which to transmit the packet;
    transfer the packets to the appropriate I/O port for
        transmission to the packets' destination;
    destroy dequeued datagram descriptors;
}
```

Reassemble Received Packet Data

```
if a request to receive a specific number of packets for a specified
    channel is received from the streamer process then
```

-continued

```
{
  dequeue one datagram descriptor from the head of the
    receive queue associated with the specified channel
    for each packet to be reassembled;
  retrieve the packets pointed to by the dequeued datagram
    descriptors from the packet buffer;
  Loop while more data in retrieved packet payloads
  {
    if the offset field of the datagram descriptor indicates
        that the payload data of the retrieved packet
        is to be placed in an allocated but incomplete
        data unit descriptor then
          insert data of the payload of the retrieved
            packet into the segment pointed
            to by the allocated data unit
            descriptor until the end of
            segment is reached;
    else
    {
      allocate a data unit descriptor;
      insert data of the payload of the retrieved
        packet into the segment pointed to by
        the allocated data unit descriptor until
        the end of segment is reached;
    }
    if a data unit descriptor is completed then
      return data unit descriptor to appropriate
      application;
  }
  destroy dequeued datagram descriptors;
}
Obtain Data For Transmission if data is received for transmission on channel input_channel_ID
  then
  loop while more received data to segment
  {
    if the transmission queue for input_channel_ID is full
        then
        if replacement attribute of this channel = =
          non-replaceable then
        {
          indicate where writing stopped;
          break;
        }
        else
        {
          dequeue datagram descriptor from head
            of transmit queue associated
            with input_channel_ID;
          retrieve packet from packet buffer
            pointed to by the dequeued
            datagram descriptor;
          destroy the dequeued datagram
            descriptor and retrieved packet;
        }
    segment data into a packet;
    store the segmented packet in the packet buffer;
    allocate a datagram descriptor and set pointer to point
      to memory location at which the segmented
      packet is stored in the packet buffer;
    enqueue the allocated datagram descriptor into the
      tail of the transmit queue associated with
      input_channel_ID;
  }
Receive Packets from I/O Port if an I/O port has a packet to be received then
{
  access channel_table to determine the channel of the
    received packet;
  store the received packet in the packet buffer;
  allocate a datagram descriptor for the packet which points
    to the location in the packet buffer at which the
    received packet was stored;
  enqueue the allocated datagram descriptor into the tail of
    the receive queue associated with the channel of the
    received packet;
}
```

The operation of the invention is now described with reference to FIG. 7. This discussion is divided into the following sections to facilitate the understanding of the invention: A. Defining Channels, B. Allocating Channels, C. Application Transfer of Data on Allocated Channels, D. Regulating Transmission and Receipt of Data, E. Packet Transmission and Receipt from I/O Ports, and F. Communication Set Up.

A. DEFINING CHANNELS

Initially, a system designer utilizes the formulation process 310 to generate the channel type table 312 such as is depicted below:

Channel Type Table

| channel_type | attribute1 (Access Mode) | attribute2... |
|---|---|---|
| CTRL (control) | non-replaceable | ... |
| CM (continuous media) | replaceable | ... |
| IM (interactive media) | replaceable | ... |
| RD (reliable data) | non-replaceable | ... |

Once initially defined, the channel type table 312 is not altered during normal operation. Illustratively four types of channels are defined: CTRL (control) for delivering control messages, CM (continuous media) for delivering video, audio or other streamed data, IM (interactive media) for delivering interactive communications, such as telephonic audio, teleconference video, teletext, etc., and RD (reliable data) for delivering data with a high level of integrity (lower incidence of error). Furthermore, fixed attribute values are defined for each attribute for each channel type. Illustratively, the attributes are preselected. An exemplary attribute called "access mode" is shown above as attribute1. This attribute has two possible attribute values, namely, replaceable and non-replaceable. As discussed in greater detail below, this attribute controls the ability to accept packets for transmission when the transmit queue, e.g., the transmit queue 334-1, of the corresponding channel, e.g., the channel 1, is full. If the transmit queue 334-1 corresponds to a channel with non-replaceable access mode, the packet cannot be accepted.

B. ALLOCATION AND DEALLOCATION OF CHANNELS

When an application desires to communicate, the application first issues a request to allocate one or more communication channels of the predefined channel types to the real-time scheduler process 320. Only channels of the predefined type (in the channel type table 312) may be allocated. Illustratively, each communication channel is a simplex communication channel, i.e., for communicating in a single direction (transmitting or receiving but not both). As shown, N channels are provide for transmission and M-N channels are provided for receipt where N and M are integers. For example, suppose the application wishes to transmit previously stored (non-interactive) real time audio and video data. The application may therefore issue a request for a CTRL channel and two CM channels. When issuing the request, the user or application can specify users-definable parameter values for a preselected set of parameters. For example, the following is an illustrative preselected set of parameters: QOS (quality of service), (BW) bandwidth, buffers, header information, channel direction (transmit or receive). Illustratively, the real-time scheduler process 320 assigns default parameter values for those parameters not specified by the application or user. However, at least some basic header information must be provided by the application. In the case of a transmit channel, the application must provide enough header information to construct a packet for transmission and routing to a destination host (e.g., the address of the host which is to receive the packet). In the case of a receive channel, the application must provide enough header information to correlate a received packet to the channel to which it corresponds.

In response to receiving requests to allocate channels, the real-time scheduler process 320 first determines if there are sufficient resources to accommodate the requested channels in addition to previously allocated channels. The resources include: buffer space (e.g., in the buffers 332, 338), bandwidth on the appropriate communications network, space in the allocated channels table 314, etc. If insufficient resources are available to satisfy a requested channel of a request, the real-time scheduler process 320 may:

(1) reject the request entirely, (2) reject only those channels of the request for which insufficient resources are available, or (3) negotiate with the application (offer to allocate a channel with fewer resources, but which can be accommodated).

If there are sufficient resources to satisfy the request for one or more channels, the real-time scheduler process 320 allocates the necessary resources and causes the formulation process 310 to allocate the requested channels with the specified and/or default parameter values. In response, the formulation process 310 allocates the channels by adding table entries to the allocated channel table 314 for the requested channels. For example, suppose that before the above request for one CTRL channel and two CM channels (for the non-interactive audio video communications), the allocated channel table 314 possessed the following entries:

Allocated Channel Table (initial)

| channel_ID | parameters | channel_type | attributes |
|---|---|---|---|
| 1 | QOS = 1, buf. = 1, BW = def.,... | CTRL | nonrepl. |
| 2 | QOS = 1, buf. = 2, BW = 64kbit/sec,... | RD | nonrepl. |
| 3 | QOS = 3, buf. = 3, BW = 56kbit/sec,... | CM | repl. |
| 4 | QOS = def., buf. = 20, BW = 1.2Mbit/sec,... | CM | repl. |

Suppose the requested channels are CTRL with basic header information and receive direction, CM with basic header information, 1.55 Mbit/sec, 10 buffers and transmit direction and CM with basic header information, 384 kbit/sec, 3 buffers and transmit direction. The formulation process 310 adds three entries to the allocated channel table 314 as follows:

Allocated Channel Table (subsequent)

| channel_ID | parameters | channel_type | attributes |
|---|---|---|---|
| 1 | QOS = 1, buf. = 1, BW = def.,... | CTRL | nonrepl. |
| 2 | QOS = 1, buf. = 2, BW = 64kbit/sec,... | RD | nonrepl. |

Allocated Channel Table (subsequent)

| channel_ID | parameters | channel_type | attributes |
|---|---|---|---|
| 3 | QOS = 3, buf. = 3, BW = 56kbit/sec,... | CM | repl. |
| 4 | QOS = def., buf. = 20, BW = 1.2Mbit/sec,... | CM | repl. |
| 5 | QOS = def., buf. = def., BW = def., rec.,... | CTRL | nonrepl. |
| 6 | QOS = def, buf. = 10, BW = 1.55Mbit.sec, xmit,... | CM | repl. |
| 7 | QOS = def, buf. = 3, BW = 384kbit/sec, xmit,... | CM | repl. |

In addition to allocating the channels, the formulation process 310 generates a transmit queue 334 or a receipt queue 336 for each channel. Illustratively, the CTRL channel 5 is a receipt channel and the CM channels 6 and 7 are transmit channels. Thus, the formulation process 310 generates a receipt queue, e.g., the queue 336-M, for channel 5, a transmit queue, e.g., the transmit queue 334-(N-1) for the channel 6 and a transmit queue, e.g., the transmit queue 334-N, for the channel 7. Illustratively, the formulation process 310 allocates a transmission or receipt queue 334 or 336 of a size which depends on the buffers parameter of the corresponding channel. For example, the formulation process may provide each queue 334 or 336 with a number of spaces for storing a datagram descriptors equal to the number of buffers specified in the buffers parameter. Thus, the formulation process 310 allocates a transmit queue 334-(N-1) (for channel 6) with a capacity to store 10 datagram descriptors and a transmit queue 334-N (for channel 7) with a capacity to store 3 datagram descriptors. Likewise, the formulation process 310 allocates a receipt queue 336-M (for channel 5) with a capacity to store a default number of datagram descriptors. After allocating the channels, the formulation process 310 returns the channel_ID to the application for purposes of providing the application a reference for accessing the channel.

An application can also deallocate channels by issuing an appropriate request to the real-time scheduler process 320 which specifies the channel_ID's of the channels to be deallocated. The real-time scheduler process 320 deallocates any resources, such as bandwidth and buffers reserved for the channels to be deallocated. The real-time scheduler process 320 also causes the formulation process 310 to remove the table entries in the allocated channel table 314 corresponding to the channels to be deallocated. The formulation process 310 furthermore destroys the receive queues 336-(N+1), . . . , or transmit queues 334-1, . . . , corresponding to the deallocated channels.

C. APPLICATION SUBMISSION AND RECEIPT OF DATA ON CHANNELS

The applications which have information to transmit issue a request to the streamer process to transmit data on a specified transmit channel. The request includes a segment of data for transmission and the channel ID of the transmission channel on which the data is to be transmitted. In response, the streamer process 330 executes the following steps so long as there is remaining data to be transmitted. First, the streamer process 330 determines if the transmission queue, e.g., the transmission queue 334-1, associated with the specified transmit channel, e.g. channel 1, is full. If not, the streamer process 330 segments the data (or a part thereof) into a packet. The streamer process 330 then stores the packet in the packet buffer 332. (illustratively, the packet buffer is a part of the main memory 116 or disk memory 118 designated for temporarily storing packets.) In addition, the streamer process 330 allocates a datagram descriptor for the stored packet. In allocating the datagram descriptor, the streamer process writes appropriate values in each field of the datagram descriptor. For example, the streamer process 330 writes in the pointer field the location of the stored packet in the packet buffer 332. The streamer process 330 also writes in the offset field the location, relative to the start of the segment, of the first byte of the payload of the packet. For example if the first byte segmented into the packet payload is the 512th byte of the data segment, the streamer process 330 writes the value 512 in the offset field. This offset information is also stored in the header of the packet. The purpose of the offset field is described in greater detail below in connection with receiving packets. The streamer process 330 enqueues each datagram descriptor into the tail of the transmit queue, e.g., the transmit queue 334-1, associated with the channel on which the packet is to be transmitted, e.g., the channel 1. The actual transmission of the packets is described in greater detail below.

Assume now that the transmit queue 334-1 into which the datagram descriptor is to be placed is full. In such a case, the streamer process 330 accesses the allocated channels table 314 to determine the access mode attribute of the channel (e.g., channel 1). If the packet is to be transmitted on a channel (e.g., channel 1) having a replaceable access mode attribute value, the datagram descriptor at the head of the respective transmit queue of the channel (e.g., the transmission queue 334-1 of the channel 1) is dequeued. (The packet corresponding to the dequeued datagram descriptor is retrieved from the packet buffer 332. Then, both the datagram descriptor deleted from the head of the queue 334-1 and its corresponding packet are discarded.) This creates a space at the tail of the queue (e.g., the queue 334-1) into which the datagram descriptor of the newly generated packet to be transmitted is inserted. On the other hand, if the packet is to be transmitted on a channel having a non-replaceable access mode attribute value, the datagram descriptor for the newly generated packet is not enqueued. Instead, the streamer process 330 issues a message to the application indicating that no more data can be transmitted and indicating at what point in the data segment acceptance of data stopped.

Whenever data is reassembled from received packets, the streamer process 330 delivers the reassembled data directly to the corresponding application. When the streamer process 330 reassembles data from received packets, the reassembled data is stored temporarily in the receive buffer 338. (Like the packet buffer 332, the receive buffer 338 is part of the main memory 116 or disk memory 118 which is designated for temporarily storing reassembled data.) The streamer process 330 allocates a data unit descriptor which points to the location of the reassembled data in the receive buffer 338. Therefore, the streamer process 330 need only return the data unit descriptor for the reassembled data. The reassembly of data from received packets is discussed in greater detail below.

D. REGULATION OF TRANSMISSION AND RECEIPT OF DATA ON CHANNELS

The real-time scheduler 320 responds to a timer process 340 which timer process 340 transfers a control message to the real-time scheduler 320 at regular intervals. In response to the control messages of the timer process, the real-time scheduler 320 examines the allocated channels table 314. Based on this analysis, the real-time scheduler 320 determines on which channels data should be transmitted and received and how much data should be transmitted thereon or received therefrom. This determination is made based on the attribute and parameter values of each channel. For instance, CM channels should transmit and receive data at an approximately continuous rate (equal to the bandwidth parameter). If too little information is received, the application could underflow and a humanly detectable gap will occur in the communications. If too much information is received, the application could overflow and some information will be discarded. Generally speaking, most CM channels can tolerate a little temporary variance in data rate provided that the data rate on average is equal to the bandwidth parameter value. Furthermore, low bandwidth channels should not be allocated any more bandwidth than specified by their bandwidth parameter values so that adequate bandwidth will be available for the higher bandwidth channels. Thus, the real-time scheduler 320 regulates the flow of information on each channel so as to allocate an appropriate amount of bandwidth to each channel.

After determining on which channels transmission and receipt of data should occur, and how much data to transmit or receive, the real-time scheduler process 320 issues one or more requests to the streamer process 330 for transmitting packets, or for reassembling data segments from received packets, of specified channels. In response to the requests, the streamer process 330 enables the transmission or receipt of data on the specified channels of approximately the specified amount. Illustratively, the real-time scheduler process 320 sequentially issues a request to transmit or receive a specified number of packets of each designated channel separately.

In the case of receipt, the streamer process 330 dequeues, in a first-in first-out order, datagram descriptors from the head of the receipt queue 334-(N +1), 334-(N+2), ..., 334-M associated with the receive channel N+1, N+2, ..., M designated in the request issued by the real-time scheduler process 320. Illustratively, the number of datagram descriptors dequeued equals the number of packets to be received. The streamer process 330 reassembles the data segments from the payload data in the packets indicated by the dequeued data unit descriptors. In so doing, the streamer process 330 accounts for the possibility that packets may have been received out of order. Typically, packets transmitted in a LAN, such as an Ethernet LAN, arrive in the same sequential order in which they are transmitted. However, packets transmitted on a WAN, such as the Internet, typically arrive in a different order that the order in which they were transmitted. To ensure that data is reassembled in the proper order from the received packets, the streamer process illustratively uses the information stored in the offset field to ensure proper relative placement of the reassembled data of each packet.

The reassembled data is then placed in one of the receive buffers 338. The streamer process 330 also allocates a data unit descriptor for each segment which indicates the location of the segment in the receive buffers 338. The streamer process 330 transfers the data unit descriptor which points to the appropriate receive buffer containing the reassembled data segment to the appropriate application. Illustratively, the streamer process 330 waits until each data segment is completed, i.e., until a requisite amount of data is placed in the data segment, before transferring the data unit descriptor to the application.

In the case of transmission, the streamer process 330 dequeues, in a first-in first-out order, datagram descriptors from specified transmit queues 334-1, 334-2, ..., 334-N associated with the transmit channels 1, 2, ..., N on which information is to be transmitted. The channels of the transmit queues from which datagram descriptors were dequeued are indicated in the requests received from the real-time scheduler process 320. Illustratively, the requests also indicate the number of packets to be transmitted for each transmit channel 1, 2, ..., N. The streamer process 330 accesses the allocated channel table 314 to determine the appropriate I/O port 122 from which to transmit the packet. (Illustratively, this is either stored as a parameter or discernable from a parameter which specifies the destination of the packet). The streamer process 330 then transfers the packets indicated by the dequeued datagram descriptors from the packet buffer 332 to the appropriate I/O ports 122 for delivery to the intended destinations of the packets. The streamer process 330 then destroys the dequeued datagram descriptors.

E. TRANSMISSION AND RECEIPT OF PACKETS VIA I/O PORTS

At the lowest level are the I/O ports 122. The I/O ports 122 receive packets for transmission from the streamer process 330 and transmit the packets on the attached communications network. The I/O ports 122 also periodically receive packets destined to the host 100. Each received packet is transferred to the streamer process 330. The streamer process 330, in turn, stores the received packet in the packet buffer 332 and determines from which receipt channel the packet was received, e.g., the receipt channel N+2. To that end, the streamer process 330 accesses the allocated channels table 314. (Illustratively, the incoming packet specifies unique information, such as the channel_ID or a parameter stored for a specified channel, which can be used to correlate packets to their respective receive channels.) The streamer process 330 then generates a datagram descriptor for the received packet which indicates the location of the received packet in the packet buffer 332. The streamer process 330 may also extract offset information from the received packet header and store this offset information in the offset field of the allocated datagram descriptor. The streamer process 330 then enqueues the datagram descriptor into the tail of the appropriate receipt queue, e.g., the receipt queue 334-(N+2) of the appropriate channel N+2.

F. COMMUNICATIONS SET UP

As noted above, the communication channels allocated by each application executing (by a processor 114) at a host 100 are all simplex. To enable communication between two applications at different hosts 100, each communicating application must allocate complementary channels. That is, if a first application allocates particular channels with specific parameters for transmitting audio and receiving video, the other application must allocate channels for receiving audio and transmitting video but which otherwise have the same parameters (i.e., the same bandwidth, quality of service, etc.). Illustratively, two hosts 100 follow a communication set up procedure to ensure that allocated channels may be used to communicate between applications executing at different nodes. Note that two hosts 100 which are intended to communicate with each other should have identical channel type tables 312. However, it is possible for different pairs of communicating hosts to have different channel type tables 312 from pair to pair.

Illustratively, each node initially allocates a special control channel for transmission of communication set up control messages and for receipt of communication set up control messages. These control channels are advantageously connection-less; no set up is required to communicate between hosts via these control channels. Each hosts utilizes the communication set up control channels for setting up communications as follows. Suppose a first application executing (on a processor 114) at a first host 100 desires to initiate a communication with a second application executing (on a processor 114) at a second host 100 that is connected to the first host 100 via a communications medium. The first application issues a request to the real time scheduler process 320 (executing on the processor 114 of the first host 100) to allocate particular channels with specified parameters. In response, the real time scheduler process 320 determines if sufficient resources are available to allocate the requested channels. If so, the real time scheduler process 320 executing at the first host also transmits a communication set up control message packet to the second host 100 (as described in the preceding sections). The communication set up control message packet indicates the type of channels which must be allocated at the second host and specifies the parameters of those channels. For instance, suppose the first application issues a request to allocate a receive video channel of type CM with parameters bandwidth=1.55 Mbits/sec and quality of service=1 and a transmit audio channel of type IM with parameters bandwidth=384 kbits/sec and quality of service=3. The communication set up control message transmitted from the real time scheduler process 320 of the first host 100 to the second host 100 should request allocation of a transmit video channel of type CM with bandwidth=1.55 Mbits/sec and quality of service=1 and a receive audio channel of type IM with bandwidth=384 kbits/sec and quality of service=3.

The communication set up control message received at the second host 100 is treated as a request to allocate channels. This "request" issues to the real time scheduler process 320 executing (on a processor 114) at the second host 100. In response, the real time scheduler process 320 executing at the second host 100 attempts to allocate the requested channels in the above described fashion. If sufficient resources are available at the second host 100, the channels are allocated on behalf of the second application executing at the second host 100. The real time scheduler process 320 at the second host 100 then transmits a communication set up control message back to the first host indicating that the appropriate complementary communication channels were allocated at the second host 100. This returned control message is received at the real time scheduler process 320 of the first host 100. In response, the real time scheduler process at the first host 100 completes the channel allocation for using the allocated channels (by issuing to the formulation process 310 the appropriate requests to allocate channels).

If insufficient resources are available at the second host 100, the real time scheduler process 320 executing at the second host 100 may (1) reject the request outright, (2) reject the request in part as to those channels for which insufficient resources are available and accept the remainder of the request, or (3) attempt to negotiate by offering to allocate channels requiring fewer resources but which can be accommodated at the second host 100. The real time scheduler process 320 executing at the second host 100 illustratively transmits a communication set up control message indicating one of these three actions to the first host 100 via the communication set up control channel. The control message is received by the real time scheduler process 320 at the first host 100. In response, the real time scheduler process 320 at the first host may also: (1) reject the request issued by the first application outright, (2) reject the request in part as to those channels for which the second host indicated that there are insufficient resources, or (3) attempt to negotiate with the first application by offering to allocate channels requiring fewer resources, etc. In the event that the real-time scheduler 320 at the first host 100 rejects, in whole or in part, the request issued by the first application process (in response to a rejection/negotiation message received from the second host), the real-time scheduler process 320 deallocates any resources for those channels which are rejected (by the first host).

Thus, using the above communication set up procedure, each application can simply and efficiently initiate a communication with applications executing at other hosts. As noted above, the initiating application need only issue a request to allocate channels. Once allocated, the communication channels are available for enabling communication between the initiating application and another application at a remote host.

Note that the real-time scheduler 320 and streamer processes 330 provide for preemptive communication. That is, the streamer process 330 transmits or receives information for specific selected channels. The specific channels are selected by the real-time scheduler process 320 depending on the user-definable parameters and fixed attributes of all of the allocated channels in the allocated channels table 314.

Note also that the two step formulation process 310 enables a system designer to predefine certain channels types but allows the application to allocate channels of these types with user-definable parameters. Thus, the application is not burdened with low level details of defining channel types with attributes that will not vary from channel to channel of the same type. On the other hand, the application has the flexibility to allocate channels of the predefined types with varying parameters. This facilitates communications of the multimedia type. Enough criteria of the channels is predefined to reduce the complexity of providing multimedia communication, yet enough flexibility in allocating channels is provided to tailor the multimedia communication to meet specific needs.

Figure 1:
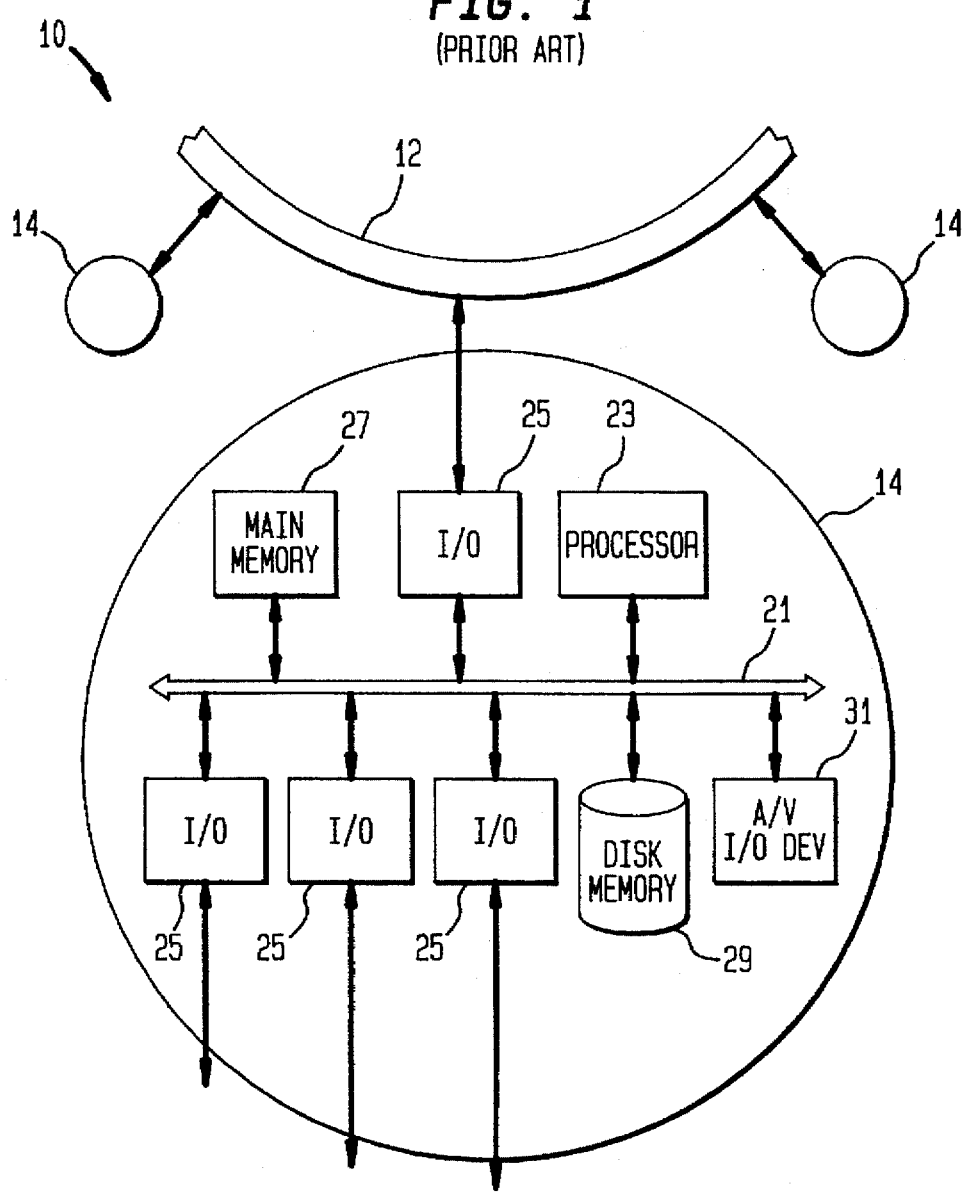
FIG. 1 shows a conventional communications network.
Figure 2:
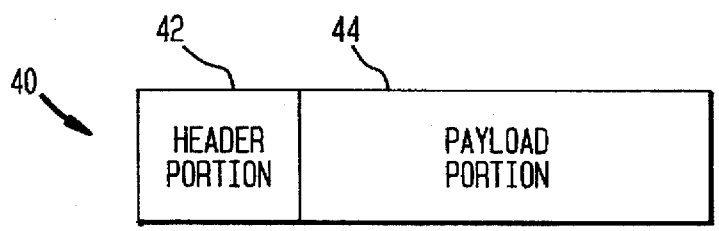
FIG. 2 shows a conventional packet.
Figure 3:
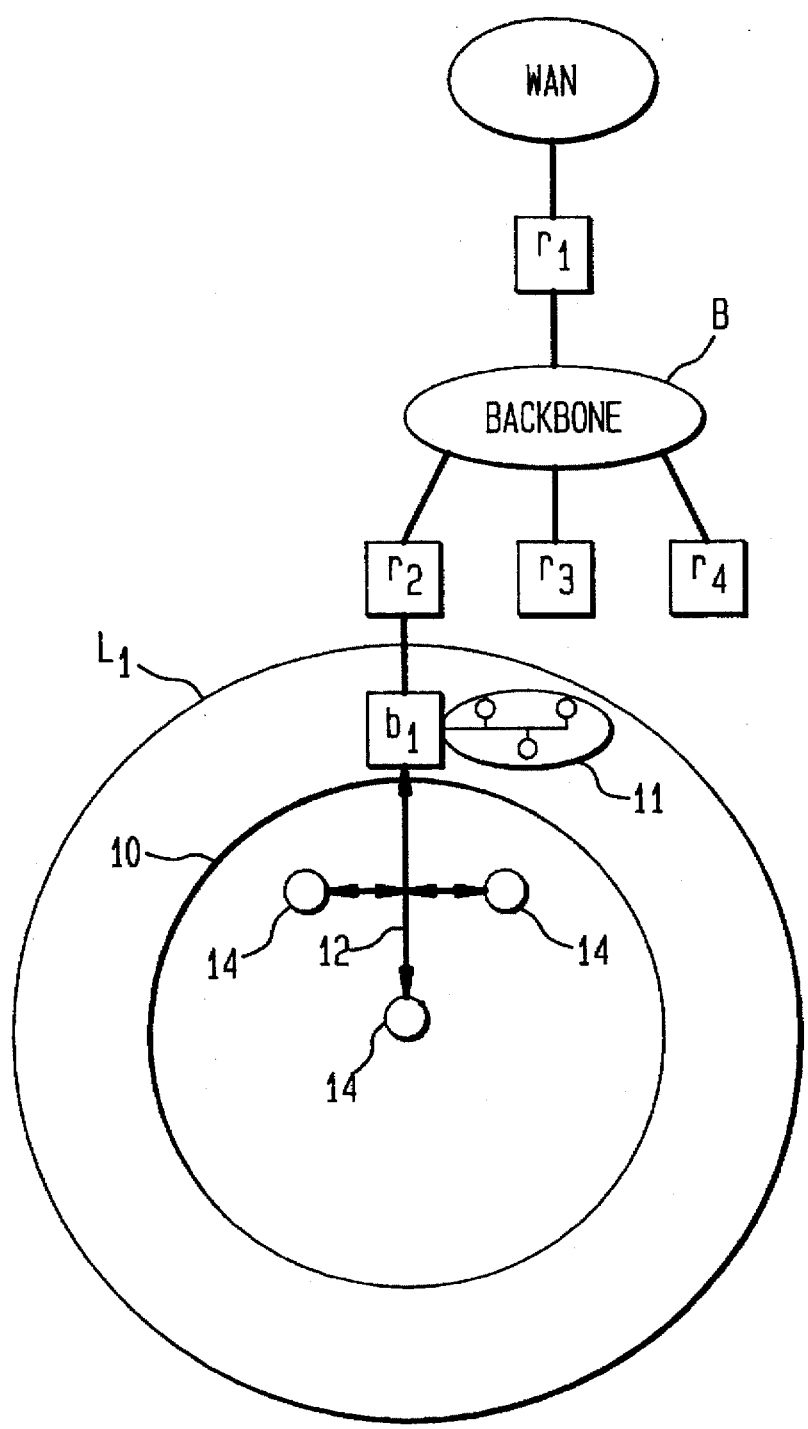
FIG. 3 shows the interconnection of the network of FIG. 1 into a large communications network.
Figure 4:
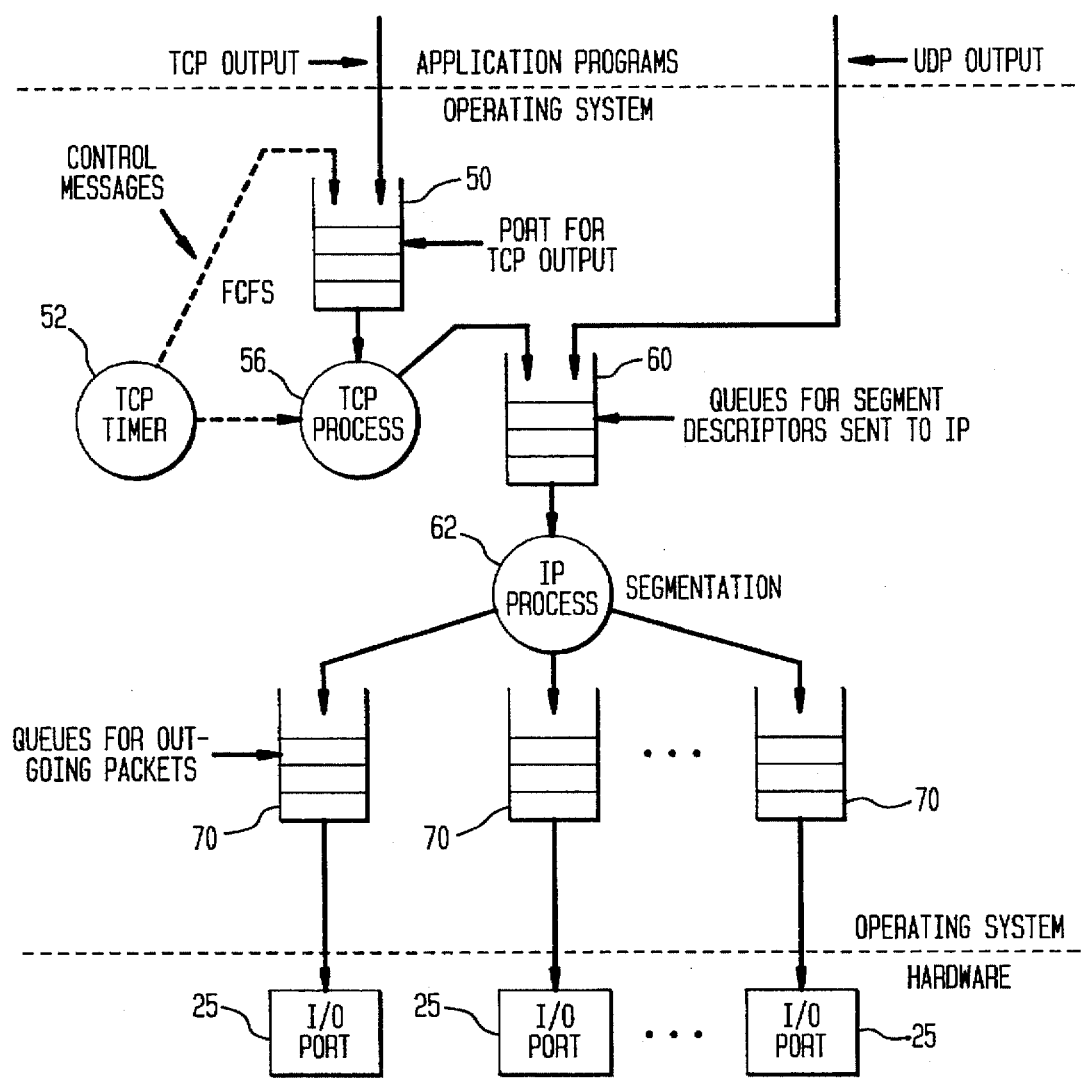
FIG. 4 illustrates a conventional packet transmit scheme according to TCP and UDP.
Figure 5:
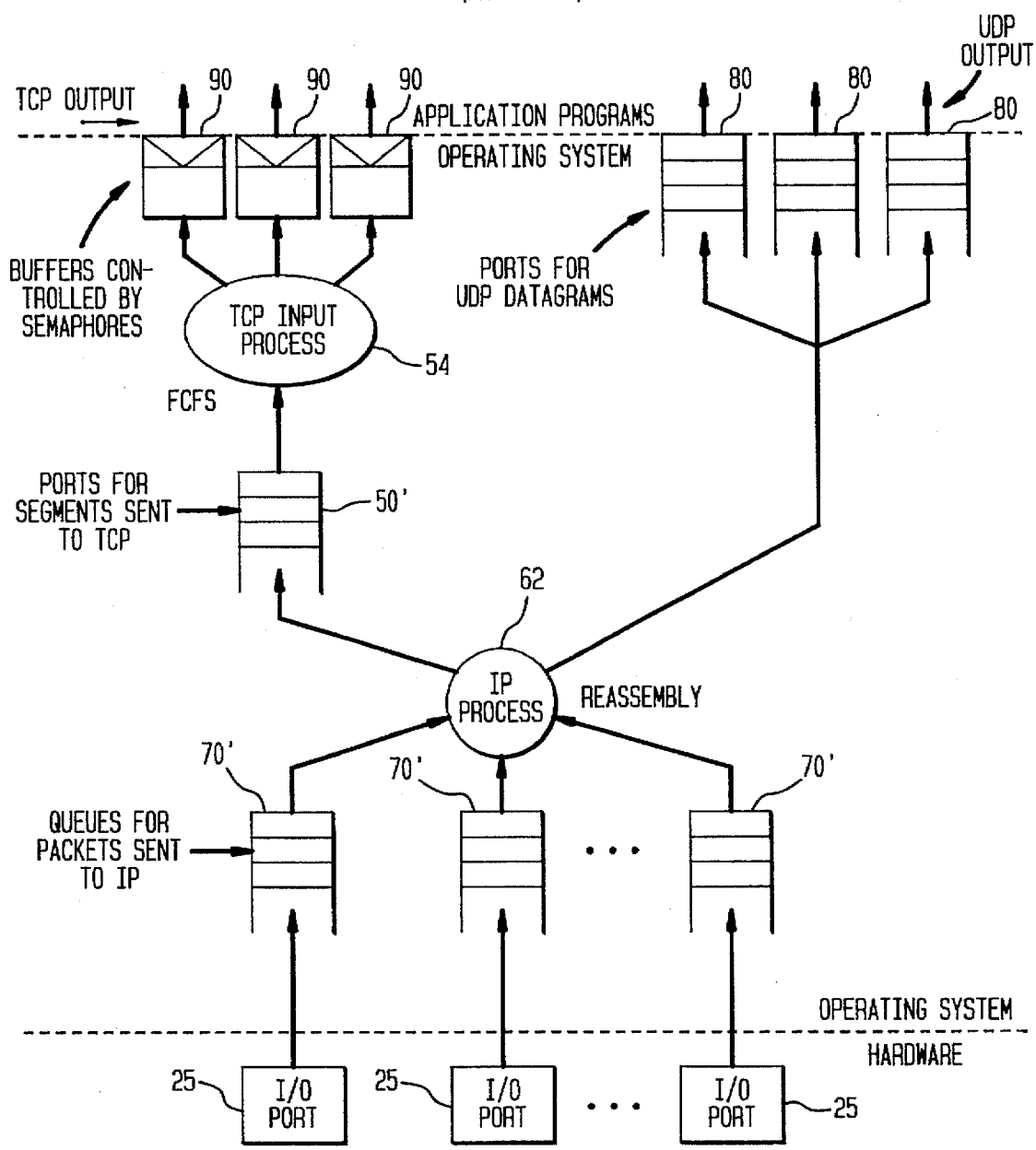
FIG. 5 illustrates a conventional packet receipt scheme according to TCP and UDP.

Note also that conventional hosts 14 (FIG. 1) and hosts 100 adapted according to the present invention may be connected to the same communications medium. Thus, there is no requirement to adapt or disconnect each host already connected to an existing network.

In short, a communication system and process are disclosed. The communication system and process provide a two-step formulation process which provide a predefined and simple procedure for creating communication channels which may be flexibly adapted to specific communications. The communication method and system according to the invention provide for single leveled queuing and for selecting preemptive and non-preemptive transmission queuing.

Finally, the above discussion is intended to be merely illustrative of the invention. Numerous alternative embodiments may be devised by those having ordinary skill in the art without departing from the spirit and scope of the following claims.

The invention claimed is:

1. A process for communicating in a communications network comprising:

initially defining one or more channel types and different fixed attributes associated with each of said channel types, dynamically allocating channels, of said channel types defined in said step of defining, as needed by applications programs based on specified user-definable parameters of each allocated channel, transmitting a bitstream including packets on said allocated channels on a schedule which depends on said parameters and said fixed attributes associated with each of said allocated channels.

2. The process of claim 1 wherein said step of transmitting further comprises the steps of:

dividing segments of information into packets to be transmitted on each allocated channel, enqueuing descriptors corresponding to said packets into queues corresponding to channels of said packets, selecting from which of said channels to transmit packets depending on said user-definable parameters and said fixed attributes of each allocated channel.

3. The method of claim 2 further comprising the step of:

submitting said information for transmission prior to said step of segmenting, wherein only single level queuing is used to sequence said information for transmission between said step of submitting and said step of transmitting.

4. The process of claim 2 wherein said step of enqueuing further comprises the step of:

in the event one of said queues is full, discarding a descriptor already in said queue and a packet corresponding thereto, depending on an access mode attribute of said respective channel.

5. The process of claim 1 further comprising:

receiving packets from one or more I/O ports corresponding to communications on said allocated channels, enqueuing a descriptor corresponding to each of said received packets in a queue corresponding to said allocated channel of said received packet, in response to said user-definable parameters of each allocated channel, selecting particular allocated channels from which to receive data, and reassembling said received packets corresponding to descriptors in queues of said selected allocated channels into data segments.

6. A process for communicating in a communications network comprising the steps of:

initially defining one or more channel types and different fixed attributes associated with each of said channel types, dynamically allocating channels, of said channel types defined in said step of defining, as needed by applications programs based on specified user-definable parameters of each allocated channel, receiving a bitstream organized into packets including packets received from one or more of said allocated channels, and reassembling said received packets into data originally transmitted on said one or more allocated channels according to a schedule which depends on said user-definable parameters and said fixed attributes associated with each of said allocated channels.

7. A host in a communication system comprising:

a processor for initially defining one or more channel types and different fixed attributes associated with each of said channel types, dynamically allocating channels, of said defined channel types, as needed by applications programs executing on said processor, based on specified user-definable parameters of each allocated channel, and scheduling packets for transmission on said allocated channels on a schedule which depends on said parameters and said fixed attributes associated with each of said allocated channels, and at least one I/O port for transmitting a bitstream including said packets as scheduled by said processor.

8. The host of claim 7 further comprising:

a memory for storing a channel type table containing an entry for each of said one or more channel types defined by said processor and an allocated channel table containing an entry for each of said channels allocated by said processor.

9. The host of claim 8 further comprising:

a bus connecting said processor, said memory and said at least one I/O port and for transferring data between said processor, memory and said I/O port including packets.

10. A communications network comprising:

a communications medium for carrying a bitstream organized into packets, and a plurality of hosts connected to said communications medium, each of said hosts comprising:

a processor for initially defining one or more channel types and different fixed attributes associated with each of said channel types, dynamically allocating channels, of said defined channel types, as needed by applications programs executing on said processor, based on specified user-definable parameters of each allocated channel, and scheduling packets for transmission on said allocated channels on a schedule which depends on said parameters and said fixed attributes associated with each of said allocated channels, and at least one I/O port for transmitting a bitstream including said packets as scheduled by said processor on said communications medium to another one of said hosts.

* * * * *